(12) United States Patent
Hafvenstein et al.

(10) Patent No.: US 10,820,586 B2
(45) Date of Patent: Nov. 3, 2020

(54) PUMP STACK ARRANGEMENT FOR AN AGRICULTURAL PRODUCT APPLICATOR

(71) Applicant: CNH Industrial America LLC, New Holland, PA (US)

(72) Inventors: David Hafvenstein, Benson, MN (US); Richard Kerner, Sunbug, MN (US)

(73) Assignee: CNH Industrial America LLC, New Holland, PA (US)

( * ) Notice: Subject to any disclaimer, the term of this patent is extended or adjusted under 35 U.S.C. 154(b) by 329 days.

(21) Appl. No.: 15/843,742

(22) Filed: Dec. 15, 2017

(65) Prior Publication Data

US 2019/0183106 A1    Jun. 20, 2019

(51) Int. Cl.
*A01M 7/00* (2006.01)
*B05B 9/04* (2006.01)
(Continued)

(52) U.S. Cl.
CPC ......... *A01M 7/0082* (2013.01); *A01C 23/047* (2013.01); *B05B 9/0406* (2013.01);
(Continued)

(58) Field of Classification Search
CPC ..... B62D 49/0678; B60B 35/04; B60B 35/08; B60B 35/10; B60B 35/1036;
(Continued)

(56) References Cited

U.S. PATENT DOCUMENTS 3,897,840 A * 8/1975 Molzahn .............. B62D 11/183
180/6.48

4,162,796 A    7/1979 Mead
(Continued)

FOREIGN PATENT DOCUMENTS

DE    31 40 441 A1    4/1983
DE    34 21 343 C1    10/1988
WO    91/04902 A2    4/1991

OTHER PUBLICATIONS

Mercer, Mike, Tractor Launch Latest Evolution at Case Corp., Diesel Progress North American Edition, Nov. 1998, pp. 1-4, vol. 64, Issue 11, Diesel & Gas Turbine Publications.
(Continued)

*Primary Examiner* — Charles G Freay
*Assistant Examiner* — Lilya Pekarskaya
(74) *Attorney, Agent, or Firm* — Rebecca L. Henkel; Rickard K. DeMille

(57) ABSTRACT

A method and apparatus for mounting a pump stack in a self-propelled agricultural product applicator utilize a pump stack mounting arrangement including a pump stack, a crossmember with a web having an opening providing clearance for passage through the opening of at least one successive pump of the pump stack, and a removable mounting plate adapted for attachment to the crossmember and the at least one successive pump on an opposite side of the crossmember from a proximal end of the pump to provide support for a distal end of the pump stack. By removing the mounting plate, detaching any successive pump in the stack from its immediately preceding pump in the pump stack, and moving the detached part of the pump stack axially through the opening, clearance is provided for servicing a pump in the stack without removal of the whole pump stack or the crossmember.

16 Claims, 6 Drawing Sheets

(51) Int. Cl.
*B05B 9/06* (2006.01)
*A01C 23/04* (2006.01)
*A01C 23/00* (2006.01)

(52) U.S. Cl.
CPC ............... *B05B 9/06* (2013.01); *A01C 23/00* (2013.01); *A01M 7/0085* (2013.01)

(58) Field of Classification Search
CPC . B60B 35/1072; B60B 35/109; B05B 9/0406; A01C 23/047; A01C 23/00; A01C 7/208; A01C 23/007; A01C 23/008; A01C 23/04; A01M 7/0082; A01M 7/0014; A01M 7/0042; A01M 7/0085; A01M 7/00; A01M 7/0003
USPC ........................................ 43/900, 132.1, 124
See application file for complete search history.

(56) References Cited

U.S. PATENT DOCUMENTS

| | | | |
|---|---|---|---|
| 5,190,218 A | | 3/1993 | Kayser et al. |
| 5,662,267 A | | 9/1997 | Hulls |
| 5,992,759 A | | 11/1999 | Patterson |
| 6,065,556 A | * | 5/2000 | Andrews ............ B62D 49/0678 180/209 |
| 6,386,554 B1 | | 5/2002 | Weddle |
| 6,454,294 B1 | * | 9/2002 | Bittner ................... B60G 99/00 280/677 |
| 6,585,056 B2 | | 7/2003 | Pellenc et al. |
| 7,150,419 B1 | * | 12/2006 | Tomlonovic ........ A01M 7/0053 239/722 |
| 8,297,634 B2 | | 10/2012 | Bittner |
| 9,301,516 B2 | | 4/2016 | Hiddema |
| 9,756,780 B2 | * | 9/2017 | Blunier ................ A01B 59/048 |
| 9,839,175 B2 | * | 12/2017 | Van Mill .............. A01C 23/008 |
| 2011/0148053 A1 | * | 6/2011 | Motebennur ............ B60G 9/00 280/6.16 |
| 2011/0308870 A1 | | 12/2011 | Rasset et al. |
| 2013/0248619 A1 | | 9/2013 | Kuphal et al. |
| 2014/0138167 A1 | * | 5/2014 | Bebernes ............... B62D 5/093 180/6.48 |
| 2015/0034736 A1 | | 2/2015 | Jones et al. |

OTHER PUBLICATIONS

Landscape & Irrigation, Post-Show Recap, Nov. 2016-Dec. 2016, pp. 1-16, vol. 40, Issue 8, Bev-AL Communications, Inc.
AG Spray Equipment, Pull-Type Sprayer Lineup, Jan. 10, 2017, pp. 1-8.

* cited by examiner

PUMP STACK ARRANGEMENT FOR AN AGRICULTURAL PRODUCT APPLICATOR

FIELD OF THE INVENTION

This invention generally relates to self-propelled agricultural product applicators, and more particularly to mounting of pump stacks of the type used in such applicators.

BACKGROUND OF THE INVENTION

Modern agricultural practices rely heavily on precise and timely applications of fertilizers, herbicides, pesticides and other chemicals. In situations where the applications must be made to standing row crops, such as corn or beans, liquid or granular materials are often applied using a high ground clearance, self-propelled applicator.

In order to provide maximum ground clearance, such applicators utilize highly specialized suspension and propulsion systems for connecting the ground engaging wheels of the applicator to a frame of the applicator. Typically, separate hydraulic drive propulsion motors are provided as part of the suspension, for each drive wheel, to thereby further enhance ground clearance by minimizing the encroachment of typical drive train or suspension components into the space between the wheels under the applicator.

Such applicators typically utilize multiple hydraulic pumps to provide hydraulic fluid to separate hydraulic circuits of the applicator, such as the propulsion system, steering system, row width adjustment systems, and distribution equipment mounted on the applicator for spreading and/or spraying the agricultural product onto the crops or seedbed.

These multiple hydraulic pumps are often operatively connected to one another in a so-called "piggy-back" series arrangement, of two, to four or even more pumps, to form a pump stack driven by a single, input shaft at the proximal end of a first pump in the series of pumps forming the pump stack. The pump stack is then mounted directly to the output end of the engine of the self-propelled applicator, or is mounted remotely from the engine on crossmembers of the frame of the applicator, and connected to the engine by a drive shaft.

Having the series of pumps mounted to one another in this manner provides a compact pump stack, with a minimal amount of connecting and support members. Having the pumps mounted in this manner also has disadvantages, however, in that the entire pump stack sometimes has to be disconnected from the multiple hydraulic circuits, and removed as a unit, for servicing or repair of one or more pumps in the stack. Further disadvantage is encountered in prior applicators where one or more frame cross members supporting the pump stack have to be removed for servicing, or removal of some of the pumps in the pump stack.

It is desirable, therefore, to provide an improved apparatus and method for mounting a pump stack in a self-propelled agricultural applicator, in a manner that does not require removal of the entire pump stack and/or a supporting cross member for servicing, repair, or replacement of a pump in the pump stack.

BRIEF SUMMARY OF THE INVENTION

The invention provides a method and apparatus for mounting a pump stack in a self-propelled agricultural product applicator, utilizing a pump stack mounting arrangement including a pump stack, a crossmember including a web having an opening providing clearance for axial movement through the opening of at least one successive pump of the pump stack, and a removable mounting plate adapted for attachment to the crossmember and to the at least one successive pump on an opposite side of the crossmember from a proximal end of the pump to provide support for a the pump stack. By sequentially removing the mounting plate, detaching one of the successive pumps in the stack from its immediately preceding pump in the pump stack, and moving the detached part of the pump stack axially through the opening, clearance is provided for servicing, repairing or replacing a pump in the stack without removal of the whole pump stack or the crossmember.

In one form of the invention, a pump stack arrangement may be provided for a self-propelled agricultural product applicator having a frame defining a longitudinal axis of the frame and a transverse axis of the frame extending generally perpendicular to the longitudinal axis of the frame, with the longitudinal and transverse axes of the frame together defining a generally horizontally extending plane of the frame. The pump stack arrangement may include a pump stack, a crossmember, and a removable mounting plate.

A pump stack, according to the invention, may define a pump stack axis and include a series of commonly driven pumps fixedly attached to one another along the pump stack axis. The series of pumps may include at least one immediately preceding pump and one successive pump adapted to be driven by its respective immediately preceding pump. each of the pumps in the series has a respective axis thereof and a respective proximal and distal end thereof at substantially opposite axial ends of the pumps. The proximal end of each successive pump may substantially abut the distal end of the immediately preceding pump in the series to form the pump stack. A pump stack may also define proximal and distal ends of the pump stack at opposite axial ends of the pump stack.

Each immediately preceding pump may have a drive input at its proximal end and a drive output at its distal end, and each successive pump may have a drive input at its proximal end adapted for driven engagement with the drive output of its respective immediately preceding pump.

At least one successive pump in the pump stack may have an outer periphery thereof defining a maximum cross-sectional pump profile extending generally perpendicular to the axis of the at least one successive pump.

The first cross member may be adapted for fixed attachment to the frame for supporting the at least one successive pump. The first cross member may include a web extending in a direction generally perpendicular to the axis of the pump stack and defining an opening through the web configured to allow passage of the at least one successive pump through the opening in the web of the first cross member in a direction generally along the axis of the at least one successive pump.

The removable mounting plate may be adapted for removable attachment to the web on an opposite side of web from the proximal end of the at least one successive pump. The removable mounting plate may be further adapted for attachment to the at least one successive pump, for securing the at least one successive pump to the first cross member and providing support to the pump stack in a manner allowing at least one of the pumps of the pump stack having its proximal end on an opposite side of the web from the mounting plate to be removed from the pump stack, after removal of the mounting plate, without removal of the first cross member from the frame.

In some forms of the invention, a pump stack arrangement for a self-propelled agricultural product applicator may further include a second crossmember, that is adapted for fixed attachment to the frame and to at least one immediately preceding pump for supporting the at least one immediately preceding pump and the pump stack, in such a manner that the at least one of the pump of the pump stack having its proximal end on an opposite side of the web from the mounting plate and mounted to the web by the removable mounting plate can be removed from the pump stack, after removal of the mounting plate, without removal of either of the first and second cross members from the frame.

A removable mounting plate and web of the first crossmember, according to the invention, may have corresponding and cooperating plate mounting provisions for securing the removable plate to the web, with the plate mounting provisions being disposed outward in the web beyond the opening in the web.

In some forms of the invention, a removable mounting plate may be integral with the at least one successive pump mounted to the web in the first crossmember by the removable mounting plate. A series of pumps in a pump stack, according to the invention, may further include at least one cantilevered successive pump extending axially beyond the removable mounting plate on the same side of the web in the first crossmember as the removable plate. The removable mounting plate may be integral with the at least one cantilevered successive pump, in forms of the invention including a cantilevered successive pump. The at least one cantilevered successive pump, in some forms of the invention, may be integral with its respective immediately preceding pump, to form a dual pump. The removable mounting plate may be integral with such a dual pump. In some forms of the invention.

The invention may also take the form of a self-propelled agricultural applicator, having a pump stack mounted therein using a pump stack mounting arrangement or method, according to the invention.

The invention may further take the form of a method for mounting a pump stack in a self-propelled agricultural product applicator, where the pump stack defines a pump stack axis and proximal and distal ends of the pump stack at opposite axial ends of the pump stack, and includes at least one immediately preceding and one successive pump. One form of a method includes, supporting the distal end of the pump stack, using a crossmember including a web having an opening providing clearance for axial passage through the opening of at least part of the pump stack, and a removable mounting plate adapted for fixed attachment to the crossmember and the pump stack on an opposite axial side of the crossmember from the proximal end of the pump stack, in such a manner that by removing the mounting plate, detaching a successive pump in the stack from its immediately preceding pump in the pump stack, and moving the detached part of the pump stack axially through the opening, clearance is provided for servicing a pump in the stack without removal of the whole pump stack or the crossmember.

A method, according to the invention, may also include supporting the proximal end of the pump stack with a second cross member adapted for fixed attachment to the proximal end of the pump stack. A method for mounting a pump stack in a self-propelled agricultural product applicator may further include, removing the mounting plate, detaching a successive pump in the stack from its immediately preceding pump in the pump stack, and moving the detached part of the pump stack axially through the opening away from the immediately preceding pump in the pump stack, to thereby provide clearance for servicing a pump in the stack without removal of the whole pump stack or the crossmember.

A method for mounting a pump stack in a self-propelled agricultural product applicator may yet further include, moving the detached part of the pump stack axially back through the opening toward the immediately preceding pump in the pump stack, re-engaging the detached successive pump in the stack with its immediately preceding pump in the pump stack, and re-attaching the mounting plate.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
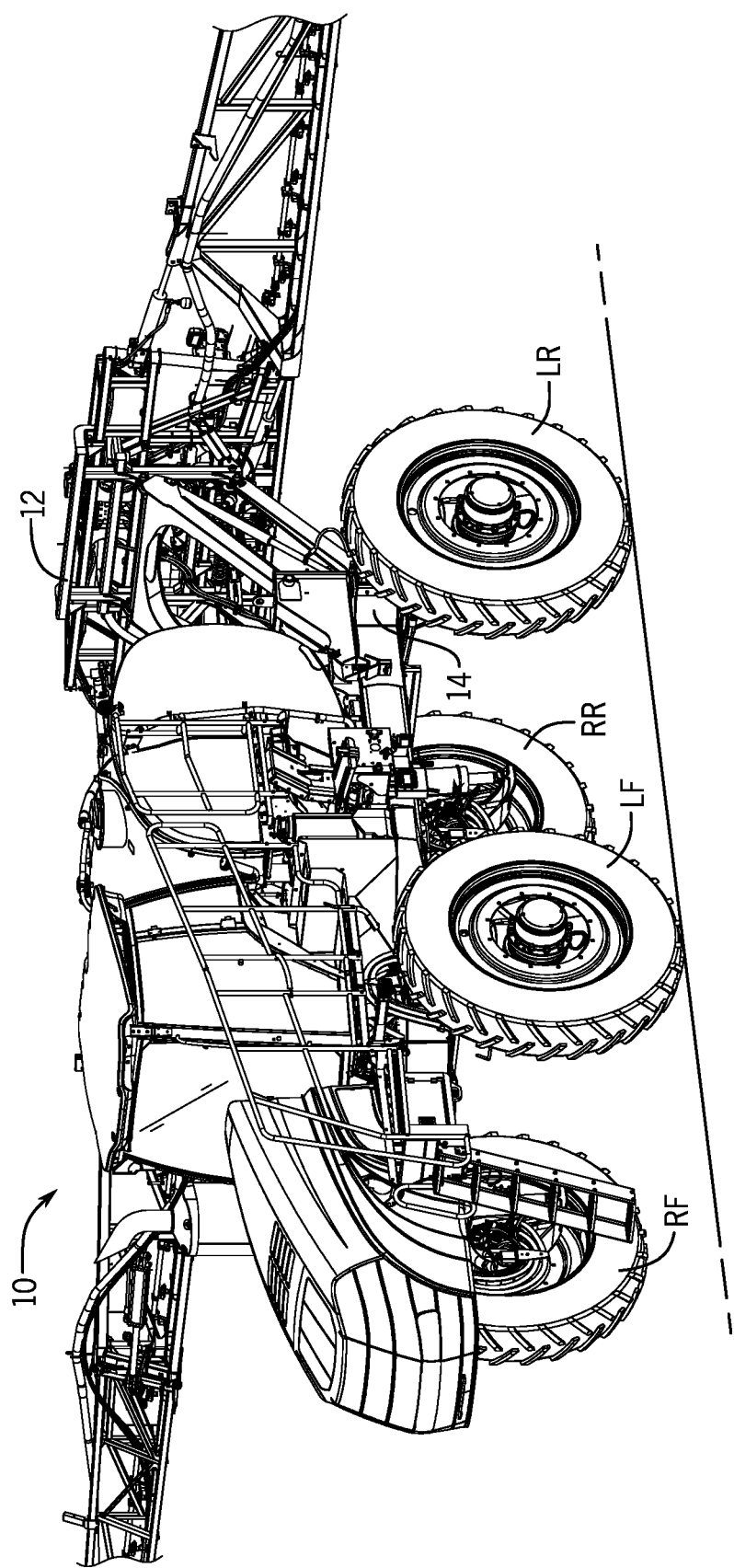
FIG. 1 is an isometric illustration of a self-propelled agricultural applicator, having a pump stack, in accordance with the invention.

FIG. 1 shows a first exemplary embodiment of the invention, in the form of a self-propelled agricultural applicator 10, carrying a sprayer arrangement 12 on a frame 14 of the applicator 10.

Figure 2:
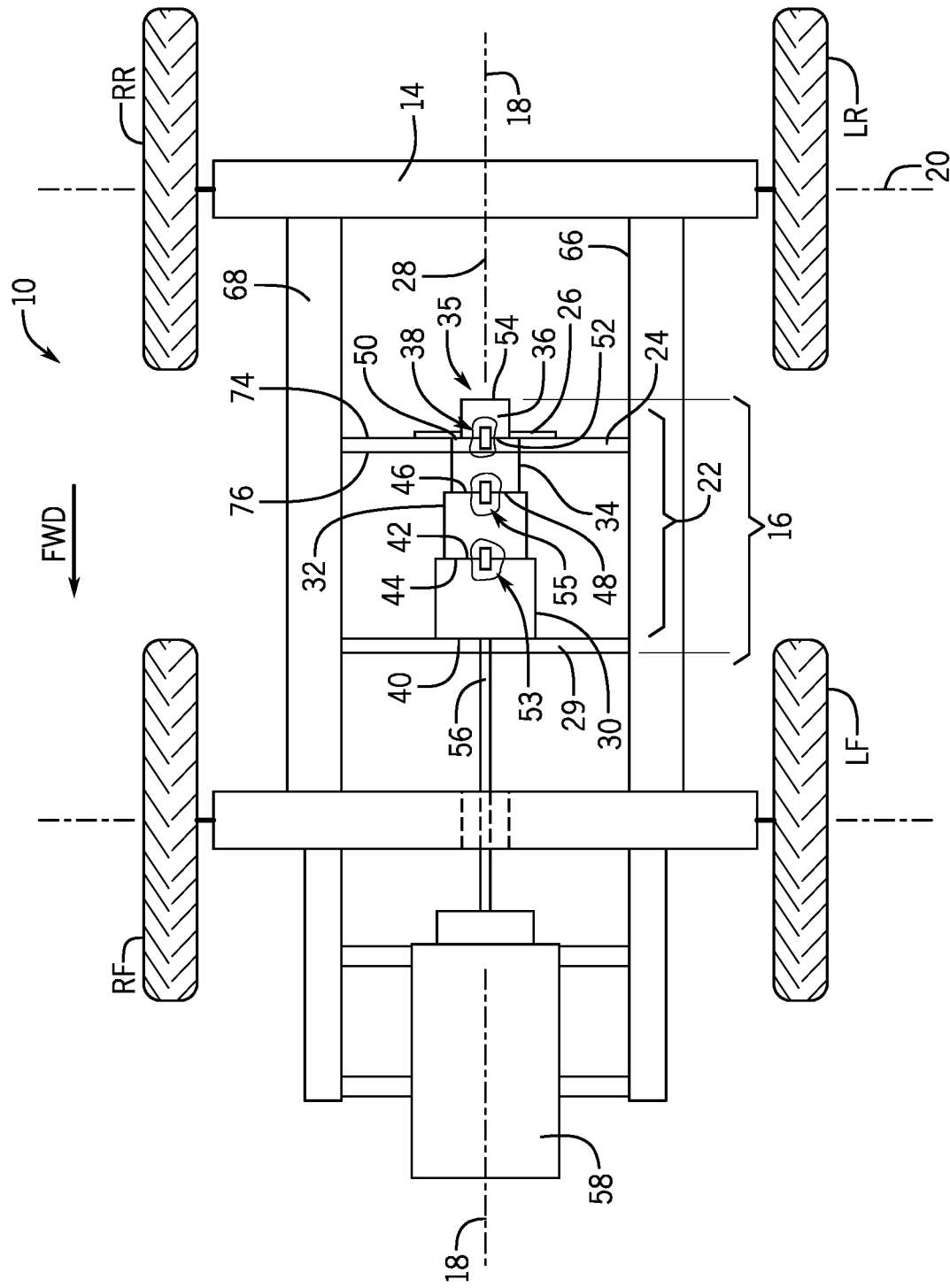
FIG. 2 is a schematic illustration of the applicator of FIG. 1, showing details of the configuration and mounting of the pump stack in the applicator.

As shown in FIG. 2, the exemplary embodiment of the applicator 10 includes an exemplary embodiment of a pump stack mounting arrangement 16, that is configured and operatively mounted to the frame 14 of the applicator 10 in a manner described in more detail below.

As further illustrated in FIG. 2, the frame 14 defines a longitudinal axis 18 of the frame 14, and a transverse axis 20 of the frame 14 extending generally perpendicular to the longitudinal axis 18 of the frame 14, with the longitudinal and transverse axes 18,20 of the frame 14 together defining a generally horizontally extending plane of the frame 14, which is illustrated by the plane of the paper in FIG. 2.

Figure 3:
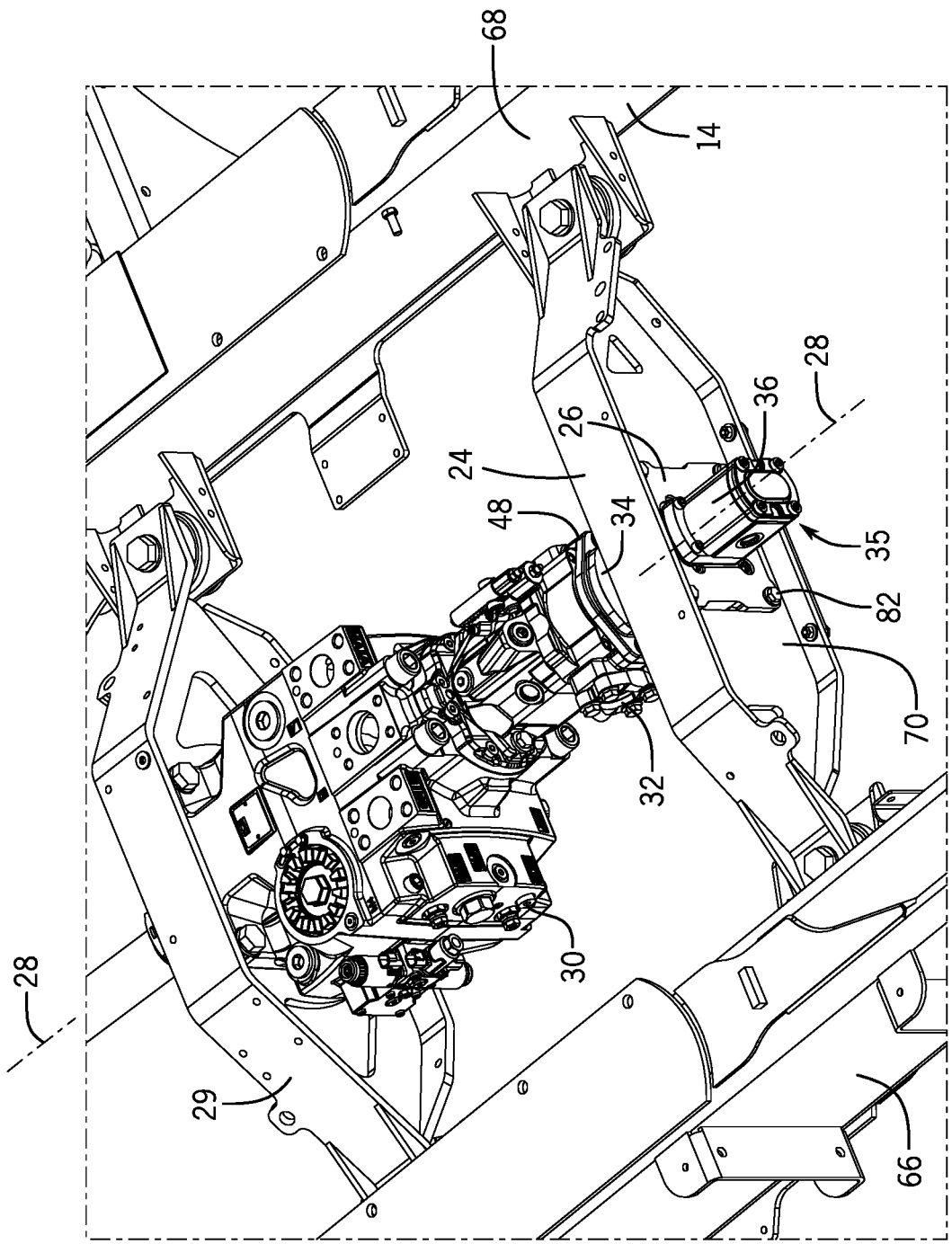
FIGS. 3 and 4 are assembled and exploded isometric views, respectively, of a pump stack mounting arrangement of the applicator of FIGS. 1 and 2.
Figure 4:
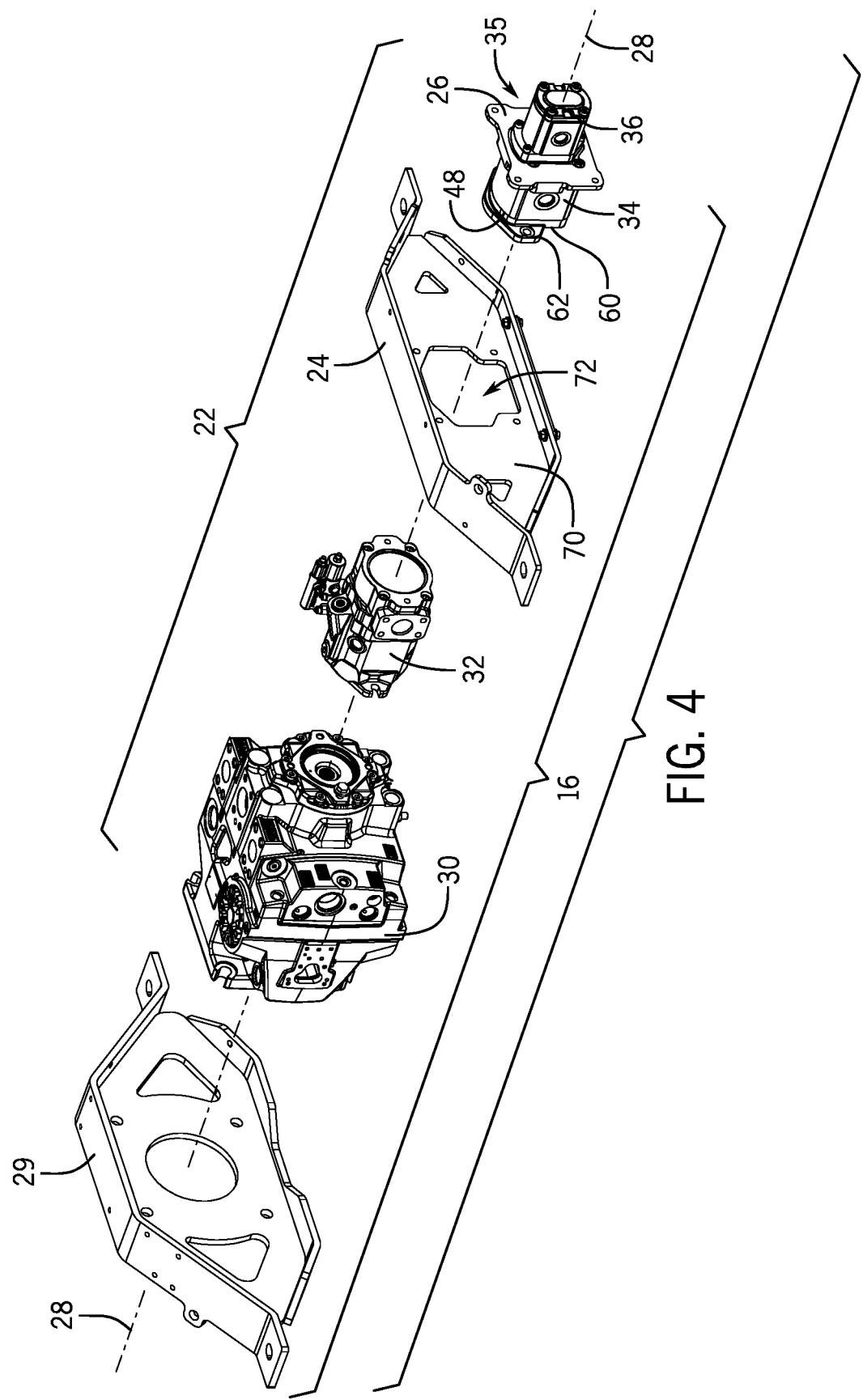

As will be understood from examining FIGS. 2-4 together, in the applicator 10, the exemplary embodiment of the pump stack arrangement 16 includes a pump stack 22, a first crossmember 24, and a removable mounting plate 26. The pump stack 22 defines a pump stack axis 28 and includes a series of four commonly driven pumps 30,32,34, 36 fixedly attached to one another along the pump stack axis 28. The exemplary embodiment of the pump stack mounting arrangement 16, in the applicator 10, also includes a second cross member 29 adapted for supporting the pump stack 16 at an opposite axial end of the pump stack 16 from the first cross member 24.

Figure 5:
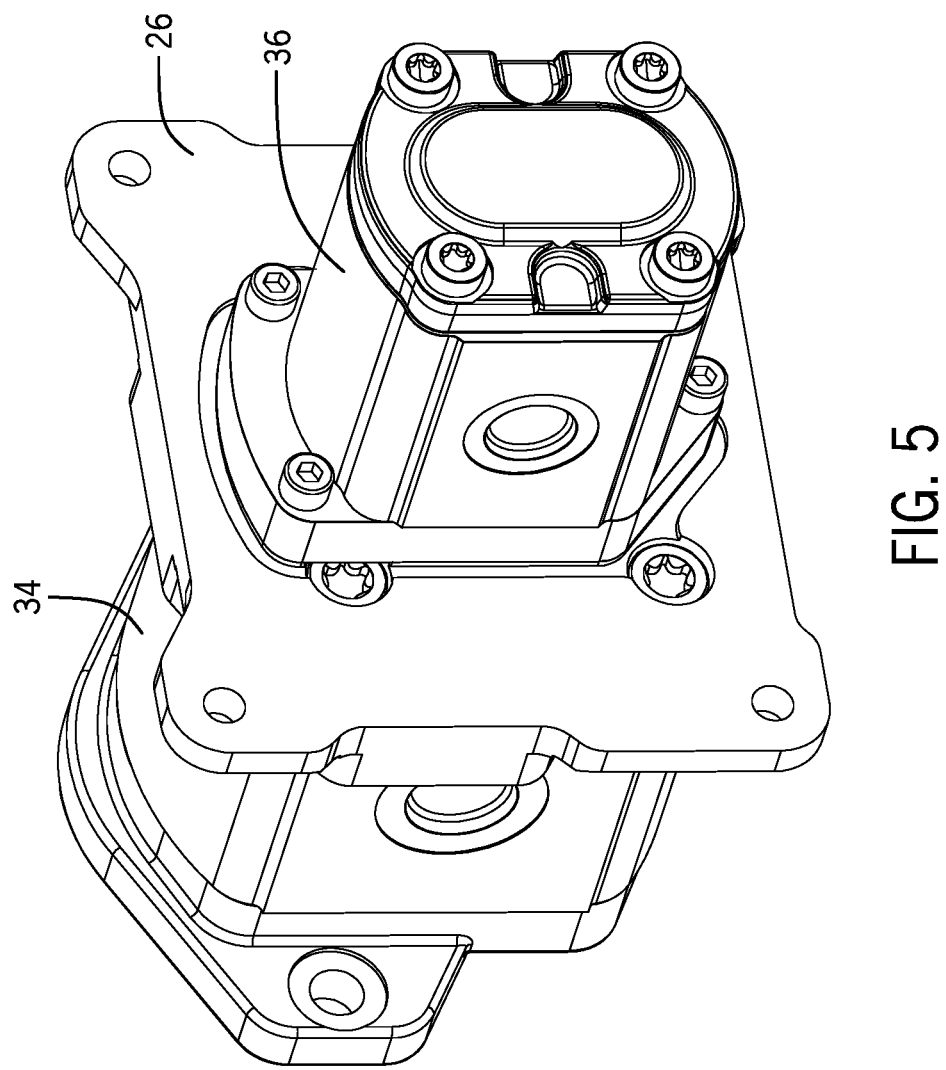
FIG. 5 is an isometric view showing third and fourth pumps of the pump stack of FIGS. 2-4 attached to a removable mounting plate of an alternate exemplary embodiment of the pump stack mounting arrangement.

In the exemplary embodiment of the removable mounting plate 26 of the applicator 10, the third and fourth pumps 34,36 are integrally configured as part of a dual pump 35 having an internal drive connection 38 for driving the fourth pump 36 from the third pump 34. The dual pump 35 of the exemplary embodiments also integrally incorporates the removable mounting plate 26 at a point on the pump housing between the third and fourth pumps 34,36. Those having skill in the art will recognize, however, that in other embodiments of the invention the mounting plate 26 may be separate from the dual pump 35. The third and fourth pumps 34,36 could also be packaged as separate pumps, with the removable mounting plate 26 being separate from either pump 34,36, with both the third and fourth pumps 34,36 being adapted for bolted attachment to the removable mounting plate 26, as shown in FIG. 5. It is also contemplated that in some embodiments of the invention that the removable mounting plate 26 may be integrally incorporated into one or the other of the third and fourth pumps 34,36.

It will be understood that the invention may be practiced with pump stacks having as few as two, or more than the four pumps 30,32,34,36 of the exemplary embodiments described herein. A series of pumps in a pump stack, according to the invention will include at least one immediately preceding pump and one successive pump adapted to be driven by its respective immediately preceding pump. In the exemplary embodiments, each of the pumps 34,36 in the series of pumps 34,36 making up the pump stack 22 has a respective axis thereof which extends essentially coaxially with the pump stack axis 28. The first pump 30 is the immediately preceding pump for the second pump 32, which is the immediately successive pump for the first pump 20. In addition to being the immediately successive pump for the first pump 30, the second pump 32 is the immediately preceding pump for the third pump 34. In similar fashion, the third pump is both the immediately successive pump for the second pump 32 and the immediately preceding pump for the fourth pump 36. The fourth pump 36 is the immediately successive pump of the third pump 34.

As shown in FIG. 2, each of the four pumps 30,32,34,36 of the exemplary embodiments defines a respective proximal and distal end 40,42,44,46,48,50,52,54 thereof at substantially opposite axial ends of the pumps 30,32,34,36. The proximal end of each successive pump 32,34,36 abuts the distal end of its respective immediately preceding pump 30,32,34, such that: the proximal end 44 of the second pump 32 abuts the distal end 42 of the first pump 30; the proximal end 48 of the third pump 34 abuts the distal end 46 of the second pump 32; and, the proximal end 52 of the fourth pump 36 abuts the distal end 50 of the third pump 34 inside the dual pump 35 in the exemplary embodiment of the pump stack 22 of the mounting arrangement 16 of the applicator 10. In the exemplary embodiments, the proximal end 40 of the first pump 30 and the distal end 54 of the fourth pump 36 in the pump stack 22 also define respective proximal and distal ends 40,54 of the pump stack 22 at opposite axial ends of the pump stack 22.

In the exemplary embodiment of the pump stack 22, the first pump 30 receives a drive input from a drive shaft 56 connected to an engine 58 of the applicator 10, for driving the pump stack 22.

As further indicated at reference numerals 53,55 and 38 in FIG. 2, each of the immediately preceding first, second and third pumps 30,32,34 of the exemplary embodiment of the pump stack 22 has a respective drive input 56,53,55 at its proximal end 40,44,48 and a drive output 53,55,38, at its distal end 42,46,50, and each successive pump 32,34,36 has a drive input 56,55,53 at its proximal end adapted for driven engagement with the drive output of its respective immediately preceding pump 30,32,34.

Figure 6:
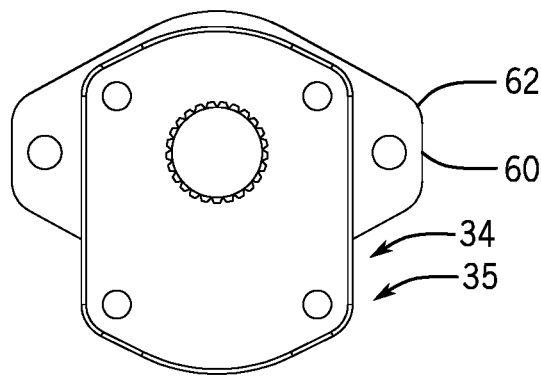
FIG. 6 illustrates a maximum cross-sectional profile of a third pump of the exemplary embodiment of the pump stack of FIGS. 2-4.

As shown in FIG. 6, the third pump 34 section of the dual pump 35, which forms a successive pump to the second pump 32, has an outer periphery 60 defining a maximum cross-sectional pump profile 62 extending generally perpendicular to the common axis 28 of the third pump 34 and the pump stack 22.

As illustrated in FIGS. 2 -4, and FIG. 7, the removable mounting plate 26 is adapted for fixed attachment to left and right longitudinal rails 66,68 the frame 14 for supporting the pump stack 22. The first cross member 24 includes a web 70 extending in a direction generally perpendicular to the axis 28 of the pump stack 22 and defining an opening 72 through the web 70. The opening 72 is configured to allow passage of the cross-sectional profile 62 of the third pump 34 through the opening 72 in the web 70 of the first cross member 24 in a direction generally along the common axis 28 of the third pump 34 and the pump stack 22.

As indicated in FIGS, 2-5, the removable mounting plate 26 is adapted for removable attachment to the web 70 of the first cross member 24 on an opposite side 74 of web 70 of the first crossmember 24 from the proximal end 48 of the third pump 34, for securing the third pump 34 to the first cross member 24 and also providing support to the distal end 54 of the pump stack 22 in a manner allowing at least one of the first, second or third pumps 30,32,34 of the pump stack 22 having its respective proximal end 40,44,48 on the opposite side 76 (i.e. the front side of the web 70 in the exemplary embodiments shown) of the web 70 from the mounting plate 26 to be removed from the pump stack 22, after removal of the mounting plate 26, without removal of either of the first or second cross members 24,29 from the frame 14.

Figure 7:
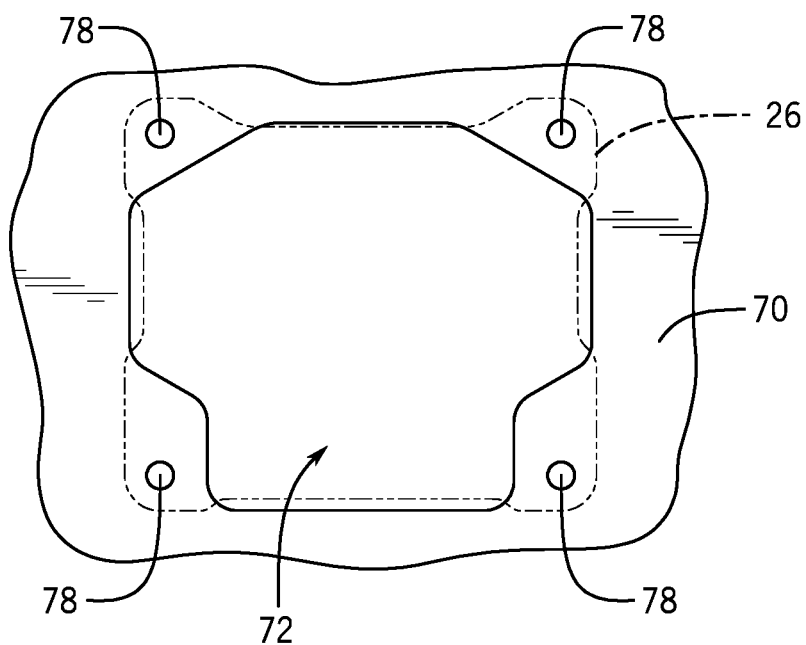
FIG. 7 is a cut-away view of a portion of a cross member of the exemplary embodiment of the pump stack mounting arrangement of FIGS. 2-4, showing an opening in the cross member configured for passage of the maximum cross-sectional profile of FIG. 6 through the opening in the cross member.
Figure 8:
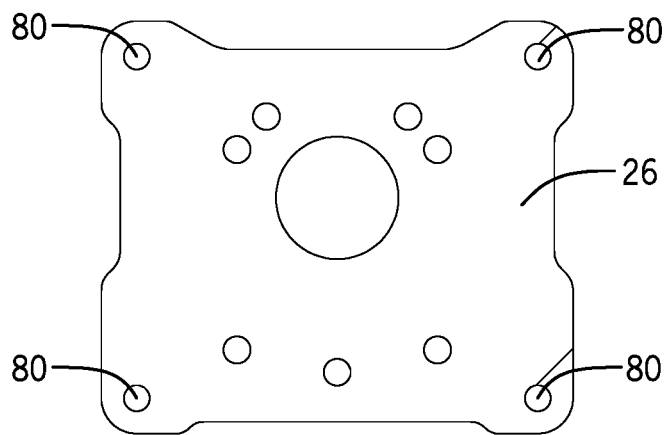
FIG. 8 shows an alternate exemplary embodiment of a removable pump stack mounting plate, according to the invention.

As indicated in FIGS. 7 and 8, the removable mounting plate 26 and web 70 of the first crossmember 24, have corresponding and cooperating plate mounting provisions, in the form of matching patterns of mounting holes 78,80 for securing the removable plate 26 to the web 24 with mounting bolts 82 (see FIG. 3) passing through the holes 78,80. As indicated by a dashed line in FIG. 7, the bolt holes 78 in the web and the removable mounting plate 26 are positioned outward in the web 70 beyond the opening 72 in the web 70.

In the exemplary embodiment of the pump stack mounting arrangement 16 described above, the fourth pump 36 is a cantilevered successive pump extending axially beyond the removable mounting plate 26 on the same side 74 of the web 70 in the first crossmember 24 as the removable plate 26. As previously described, the cantilevered fourth pump 36 is integral with its respective immediately preceding pump, i.e. the third pump 34, to form the dual pump 35, and the removable mounting plate 26 is integral with the dual pump 35. As previously state, however, it is contemplated that in other embodiments of the invention, the third and fourth pumps 34,36 might be configured as individual units attached on opposite sides of a removable mounting plate 26, such as the one shown in FIG. 8, that is separate from the pump units.

From the foregoing description of exemplary embodiments, those having skill in the art will readily recognize that the invention provides significant advantages in construction, maintenance, servicing and repair of pump stacks in self-propelled agricultural product applicators, in that by removing the mounting plate 26, detaching the first pump from the first cross member or one of the successive pumps 32,34,36 in the stack 22 from its immediately preceding pump 30,32,34 in the pump stack 22, and moving the detached part of the pump stack 22 axially through the opening 72, clearance is provided for servicing one of the pumps 30,32,34,36 in the stack 22 without removal of the entire pump stack 22 or either of the first and second crossmembers 24,29.

It should also be appreciated that, although the exemplary embodiments of the invention presented herein utilized a pump stack 22 that was supported remotely from the engine 58 by the first and second crossmembers 24,29, the invention may also be practiced in embodiments having the proximal end 40 of the pump stack 22 supported directly by engine 58, without the second cross member 29. It will be further appreciated that, although the proximal end 40 of the exemplary embodiment of the pump stack 22 in the exemplary embodiments was oriented toward the front end of the applicator 10, the invention may also be practiced with rear-engine, or other drive direction orientations.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted, Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A pump stack arrangement for a self-propelled agricultural product applicator comprising:
a frame defining a longitudinal axis of the frame and a transverse axis of the frame extending perpendicular to the longitudinal axis of the frame, with the longitudinal and transverse axes of the frame together defining a horizontally extending plane of the frame, the pump stack arrangement including a pump stack, a crossmember, and a removable mounting plate, wherein:
the pump stack defines a pump stack axis and includes a series of commonly driven pumps fixedly attached to one another along the pump stack axis, with the series of commonly driven pumps including at least one immediately preceding pump and at least one successive pump that is adapted to be driven by its respective immediately preceding pump;
each of the pumps in the series of commonly driven pumps has a respective axis thereof and a respective proximal and distal end thereof at opposite axial ends of the commonly driven pumps, with the proximal end of each successive pump that is abutting the distal end of the respective immediately preceding pump in the series of the commonly driven pumps to form the pump stack;
each immediately preceding pump has a drive input at its proximal end and a drive output at its distal end, and
each successive pump has a drive input at its proximal end adapted for driven engagement with the drive output of its respective immediately preceding pump;
the at least one successive pump has an outer periphery thereof defining a maximum cross-sectional pump profile that is extending perpendicular to the respective axis of the at least one successive pump;
the crossmember having a first crossmember that is adapted for a fixed attachment to the frame for supporting the at least one successive pump;
the first crossmember includes a web extending in a direction perpendicular to the pump stack axis and defining an opening through the web configured to allow a passage of the at least one successive pump through the opening in the web of the first cross member in a direction along the respective axis of the at least one successive pump, wherein the respective axis extends coaxially with the pump stack axis;
the removable mounting plate is adapted fora removable attachment to the web on an opposite side of the web from the proximal end of the at least one successive pump; and the removable mounting plate is further adapted for an attachment to the at least one successive pump, for securing the at least one successive pump to the first crossmember and providing a support to the pump stack in a manner allowing the at least one of the immediately preceding pump of the pump stack having its proximal end on the opposite side of the web from the removable mounting plate to be removed from the pump stack, after removal of the removable mounting plate, without removal of the first crossmember from the frame.

2. The pump stack arrangement for a the self-propelled agricultural product applicator of claim 1, further including a second crossmember adapted for a fixed attachment to the frame and to the at least one immediately preceding pump for supporting the at least one immediately preceding pump and the pump stack, in such a manner that the at least one immediately preceding pump of the pump stack having its proximal end on the opposite side of the web from the removable mounting plate can be removed from the pump stack, after removal of the removable mounting plate, without removal of either of the first and second crossmembers from the frame.

3. The pump stack arrangement for a the self-propelled agricultural product applicator of claim 1, wherein the removable mounting plate and the web of the first crossmember have corresponding and cooperating plate mounting provisions for securing the removable mounting plate to the web, with the corresponding and cooperating plate mounting provisions that are being disposed outward in the web beyond the opening in the web.

4. The pump stack arrangement for a the self-propelled agricultural product applicator of claim 1, wherein the removable mounting plate is integral with the at least one successive pump mounted to the web in the first crossmember by the removable mounting plate.

5. The pump stack arrangement for a the self-propelled agricultural product applicator of claim 1, wherein the at least one successive pump further includes at least one cantilevered successive pump extending axially beyond the removable mounting plate on the same side of the web in the first crossmember as the removable mounting plate.

6. The pump stack arrangement for the self-propelled agricultural product applicator of claim 5, wherein the removable mounting plate is integral with the at least one cantilevered successive pump.

7. The pump stack arrangement for the self-propelled agricultural product applicator of claim 5, wherein the at least one cantilevered successive pump is integral with its respective immediately preceding pump in the pump stack and forming a dual pump.

8. The pump stack arrangement for the self-propelled agricultural product applicator of claim 7, wherein the removable mounting plate is integral with the dual pump.

9. A self-propelled agricultural product applicator, comprising:
a frame defining a longitudinal axis of the frame and a transverse axis of the frame extending perpendicular to the longitudinal axis of the frame, with the longitudinal and transverse axes of the frame together defining a horizontally extending plane of the frame; and
a pump stack arrangement including a pump stack, a crossmember, and a removable mounting plate;
the pump stack defining a pump stack axis and including a series of commonly driven pumps fixedly attached to one another along the pump stack axis, with the series of commonly driven pumps including at least one immediately preceding pump and at least one successive pump that is adapted to be driven by its respective immediately preceding pump;
each of the pumps in the series of commonly driven pumps having a respective axis thereof and a respective proximal and distal end thereof at opposite axial ends of the commonly driven pumps, with the proximal end of each successive pump that is abutting the distal end of the respective immediately preceding pump in the series of the commonly driven pumps to form the pump stack;
each immediately preceding pump having a drive input at its proximal end and a drive output at its distal end, and each successive pump having a drive input at its proximal end adapted for driven engagement with the drive output of its respective immediately preceding pump;
the at least one successive pump having an outer periphery thereof defining a maximum cross-sectional pump profile that is extending perpendicular to the respective axis of the at least one successive pump;
the crossmember having a first crossmember being adapted for a fixed attachment to the frame for supporting the at least one successive pump;
the first crossmember including a web extending in a direction perpendicular to the pump stack axis and defining an opening through the web configured to allow a passage of the at least one successive pump through the opening in the web of the first crossmember in a direction along the respective axis of the at least one successive pump, wherein the respective axis extends coaxially with the pump stack axis;
the removable mounting plate being adapted for a removable attachment to the web on an opposite side of web from the proximal end of the at least one successive pump;
the removable mounting plate being further adapted for an attachment to the at least one successive pump, for securing the at least one successive pump to the first cross member and providing a support to the pump stack in a manner allowing the at least one immediately preceding pump of the pump stack having its proximal end on the opposite side of the web from the removable mounting plate to be removed from the pump stack, after removal of the removable mounting plate, without removal of the first crossmember from the frame.

10. The self-propelled agricultural product applicator of claim 9, further including a second crossmember adapted for a fixed attachment to the frame and to the at least one immediately preceding pump for supporting the at least one immediately preceding pump and the pump stack, in such a manner that the at least one immediately preceding pump of the pump stack having its proximal end on the opposite side of the web from the removable mounting plate can be removed from the pump stack, after removal of the removable mounting plate, without removal of either of the first and second crossmembers from the frame.

11. The self-propelled agricultural product applicator of claim 9, wherein the removable mounting plate and the web of the first crossmember have corresponding and cooperating plate mounting provisions for securing the removable mounting plate to the web, with the corresponding and cooperating plate mounting provisions that are being disposed outward in the web beyond the opening in the web.

12. The self-propelled agricultural product applicator of claim 9, wherein the removable mounting plate is integral with the at least one successive pump mounted to the web in the first crossmember by the removable mounting plate.

13. The self-propelled agricultural product applicator of claim 9, wherein the at least one successive pump further includes at least one cantilevered successive pump extending axially beyond the removable mounting plate on the same side of the web in the first crossmember as the removable mounting plate.

14. The self-propelled agricultural product applicator of claim 13, wherein the removable mounting plate is integral with the at least one cantilevered successive pump.

15. The self-propelled agricultural product applicator of claim 13, wherein the at least one cantilevered successive pump is integral with its respective immediately preceding pump in the pump stack and forming a dual pump.

16. The self-propelled agricultural product applicator of claim 15, wherein the removable mounting plate is integral with the dual pump.

* * * * *